(12) United States Patent
Yamazaki et al.

(10) Patent No.: US 9,206,855 B2
(45) Date of Patent: Dec. 8, 2015

(54) FIXED TYPE CONSTANT-VELOCITY UNIVERSAL JOINT

(71) Applicants: Kenta Yamazaki, Shizuoka (JP); Hiroyasu Hirukawa, Shizuoka (JP)

(72) Inventors: Kenta Yamazaki, Shizuoka (JP); Hiroyasu Hirukawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/351,651

(22) PCT Filed: Oct. 22, 2012

(86) PCT No.: PCT/JP2012/077189
§ 371 (c)(1),
(2) Date: Apr. 14, 2014

(87) PCT Pub. No.: WO2013/069438
PCT Pub. Date: May 16, 2013

(65) Prior Publication Data
US 2014/0243104 A1    Aug. 28, 2014

(30) Foreign Application Priority Data
Nov. 11, 2011   (JP) .................................. 2011-247445

(51) Int. Cl.
*F16D 3/2233* (2011.01)
*F16D 3/2245* (2011.01)
(Continued)

(52) U.S. Cl.
CPC ................ *F16D 3/24* (2013.01); *F16D 3/2233* (2013.01); *F16D 3/2245* (2013.01); *F16D 2003/22306* (2013.01); *F16D 2003/22309* (2013.01)

(58) Field of Classification Search
CPC ......... F16D 3/22; F16D 3/223; F16D 3/2233; F16D 3/2237; F16D 3/2245; F16D 3/24; F16D 2003/22306; F16D 2003/22309
See application file for complete search history.

(56) References Cited

U.S. PATENT DOCUMENTS

| 2,319,100 A * | 5/1943 | Anderson ....................... 464/144 |
| 2007/0161428 A1 * | 7/2007 | Nakao et al. ................... 464/145 |
| 2011/0212789 A1 | 9/2011 | Ooba et al. |

FOREIGN PATENT DOCUMENTS

| JP | 2004-332815 | 11/2004 |
| JP | 2007-270997 | 10/2007 |

(Continued)

OTHER PUBLICATIONS

International Search Report issued Nov. 27, 2012 in International (PCT) Application No. PCT/JP2012/077189.
(Continued)

*Primary Examiner* — Josh Skroupa
(74) *Attorney, Agent, or Firm* — Wenderoth, Lind & Ponack, L.L.P.

(57) ABSTRACT

Track grooves of an outer joint member include first and second track groove portions positioned on interior and opening sides, respectively. Each first track groove portion has an arc shape with a curvature center at a position offset to the opening side with respect to a joint center. The first track groove portions are inclined in a peripheral direction of the outer joint member with respect to a joint axial line and adjacent to each other in the peripheral direction with their inclination directions opposite to each other. Each second track groove portion has a shape that is different than each of the first track groove portions so as to increase an effective track length at a maximum operating angle. The second track groove portions are connected to the first track groove portions at a position on the opening side with respect to the joint center.

9 Claims, 15 Drawing Sheets

(51) Int. Cl.
*F16D 3/24* (2006.01)
*F16D 3/223* (2011.01)

(56) References Cited

FOREIGN PATENT DOCUMENTS

| JP | 2009-250365 | 10/2009 | |
|----|-------------|---------|---|
| JP | 2010-43667 | 2/2010 | |
| JP | 2011-106490 | 6/2011 | |
| WO | WO 2005028894 | * | 3/2005 |
| WO | 2008/018290 A1 | | 2/2008 |

OTHER PUBLICATIONS

International Preliminary Report on Patentability and Written Opinion of the International Searching Authority issued May 22, 2014 in International (PCT) Application No. PCT/JP2012/077189.

* cited by examiner

WITH OFFSET
TRACK ALLOWANCE AMOUNT: LARGE

WITHOUT OFFSET
TRACK ALLOWANCE AMOUNT: SMALL

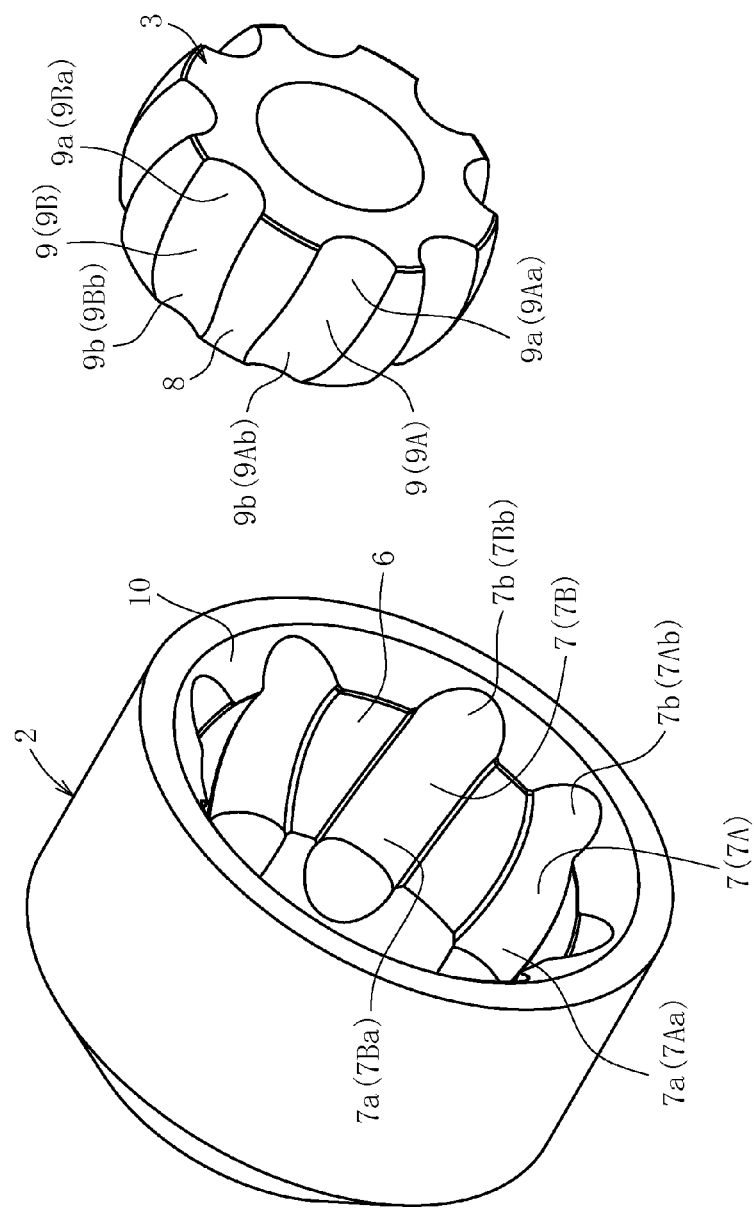

FIXED TYPE CONSTANT-VELOCITY UNIVERSAL JOINT

TECHNICAL FIELD

The present invention relates to a fixed type constant velocity universal joint, and more specifically, to a fixed type constant velocity universal joint to be used in a power transmission system of automobiles and various industrial machines, for allowing only angular displacement between two shafts on a driving side and a driven side.

BACKGROUND ART

For example, a plunging type constant velocity universal joint capable of allowing angular displacement and axial displacement is generally assembled on an inboard side (differential side) of an automotive front drive shaft. Further, a fixed type constant velocity universal joint capable of allowing only angular displacement is generally assembled on an outboard side (wheel side) of the automotive front drive shaft.

An example of the fixed type constant velocity universal joint to be used on the outboard side is described with reference to FIG. 15a, which is a vertical sectional view of a state in which a constant velocity universal joint 101 forms an operating angle of 0°, and to FIG. 15b, which is a schematic view of a state in which the constant velocity universal joint 101 forms the maximum operating angle. The constant velocity universal joint 101 is a Rzeppa type constant velocity universal joint of an eight ball type, and mainly includes an outer joint member 102, an inner joint member 103, balls 104, and a cage 105. Eight track grooves 107 are formed equiangularly in a spherical inner peripheral surface 106 of the outer joint member 102 so as to extend along an axial direction. Track grooves 109 opposed to the track grooves 107 of the outer joint member 102 are formed equiangularly in a spherical outer peripheral surface 108 of the inner joint member 103 so as to extend along the axial direction. Each ball 104 is arranged between the paired track grooves 107 and 109 (opposed to each other in a radial direction) of the outer joint member 102 and the inner joint member 103. The cage 105 for holding the balls 104 at predetermined intervals in its circumferential direction is arranged between the spherical inner peripheral surface 106 of the outer joint member 102 and the spherical outer peripheral surface 108 of the inner joint member 103. An outer periphery of the outer joint member 102 and an outer periphery of a shaft coupled to the inner joint member 103 are covered with a boot, and grease is sealed inside the joint as a lubricant (not shown).

As illustrated in FIG. 15a, the cage 105 has a spherical outer peripheral surface 112 fitted to the spherical inner peripheral surface 106 of the outer joint member 102, and a spherical inner peripheral surface 113 fitted to the spherical outer peripheral surface 108 of the inner joint member 103. The spherical outer peripheral surface 112 and the spherical inner peripheral surface 113 each have a curvature center formed at a joint center O. On the other hand, a curvature center Oo of a ball raceway center line x of each track groove 107 of the outer joint member 102 and a curvature center Oi of a ball raceway center line y of each track groove 109 of the inner joint member 103 are offset to both sides in the axial direction by equal distances with respect to the joint center O. Therefore, when the joint forms an operating angle, the balls 104 are always guided in a plane bisecting an angle formed between axial lines of the outer joint member 102 and the inner joint member 103. As a result, rotational torque is transmitted at a constant velocity between the two axes.

As illustrated in FIG. 15b, a maximum operating angle $\theta_{max}$, which is defined as a main function of the fixed type constant velocity universal joint 101, depends on an angle causing interference between an inlet chamfer 110 provided at an opening rim (inner rim portion) of the outer joint member 102 and a shaft 111. In order to secure permissible torque to be transmitted, an axial diameter d of the shaft 111 is determined for each joint size. When a large inlet chamfer 110 is formed, the length of each track groove 107 of the outer joint member 102, on which the ball 104 is brought into contact (hereinafter referred to as "effective track length"), is insufficient. As a result, the ball 104 may drop off the track groove 107, and the rotational torque cannot be transmitted. Therefore, how the inlet chamfer 110 is formed while securing the effective track length of the outer joint member 102 is an important factor in securing the operating angle. In the constant velocity universal joint 101 illustrated in FIGS. 15a and 15b, the curvature center Oo of the ball raceway center line X of the track groove 107 of the outer joint member 102 is offset to an opening side in the axial direction. Thus, there is an advantage in terms of the maximum operating angle, and the maximum operating angle $\theta_{max}$ is approximately 47°.

Further, as compared to a related-art constant velocity universal joint of a six ball type, the above-mentioned constant velocity universal joint of the eight ball type has a smaller track offset amount, a larger number of balls, and has a larger diameter. Thus, it is possible to attain a highly efficient constant velocity universal joint that is lightweight and compact, and is suppressed in torque loss. However, at an operating angle of 0°, wedge angles formed between the paired track grooves 107 and 109 of the outer joint member 102 and the inner joint member 103 are opened toward the opening side of the outer joint member 102. Therefore, due to axial forces applied from the track grooves 107 and 109 to the balls 104, loads to be applied to the spherical contact portions 106 and 112 of the outer joint member 102 and the cage 105 and the spherical contact portions 108 and 113 of the inner joint member 103 and the cage 105 are generated in a certain direction. Thus, this structure leads to restriction on achieving even higher efficiency and less heat generation.

Therefore, in order to achieve even higher efficiency and less heat generation, a fixed type constant velocity universal joint 121 of a track groove crossing type illustrated in FIGS. 16a and 16b has been proposed (see, for example, Patent Literature 1). FIG. 16a is a vertical sectional view of a state in which the constant velocity universal joint 121 forms an operating angle of 0°, and FIG. 16b is a schematic view of a state in which the constant velocity universal joint 121 forms a high operating angle. As illustrated in FIG. 16a, the constant velocity universal joint 121 mainly includes an outer joint member 122, an inner joint member 123, balls 124, and a cage 125. Although illustration is omitted, in the constant velocity universal joint 121, planes including ball raceway center lines x of eight track grooves 127 of the outer joint member 122 and a joint center O are inclined with respect to a joint axial line n-n with their inclination directions opposite to each other in the track grooves 127 adjacent to each other in a peripheral direction. In addition, each track groove 129 of the inner joint member 123 has a ball raceway center line y, which is formed so as to be mirror-image symmetrical with the ball raceway center line x of the paired track groove 127 of the outer joint member 122 with respect to a joint center plane P at the operating angle of 0° (plane including the joint center O at the operating angle of 0° and extending in a direction orthogonal to the joint axial line n-n).

As illustrated in FIG. 16a, the track groove 127 formed in a spherical inner peripheral surface 126 of the outer joint member 122 extends into an arc shape along the axial direction, and a curvature center of the track groove 127 is positioned at the joint center O. The track groove 129 formed in a spherical outer peripheral surface 128 of the inner joint member 123 extends into an arc shape along the axial direction, and a curvature center of the track groove 129 is positioned at the joint center O. Each ball 124 is interposed in a crossing portion between the paired track grooves 127 and 129 (opposed to each other in a radial direction) of the outer joint member 122 and the inner joint member 123. The cage 125 for holding the balls 124 at predetermined intervals in its circumferential direction is arranged between the spherical inner peripheral surface 126 of the outer joint member 122 and the spherical outer peripheral surface 128 of the inner joint member 123. The cage 125 has a spherical outer peripheral surface 132 fitted to the spherical inner peripheral surface 126 of the outer joint member 122, and a spherical inner peripheral surface 133 fitted to the spherical outer peripheral surface 128 of the inner joint member 123. The spherical outer peripheral surface 132 and the spherical inner peripheral surface 133 each have a curvature center formed at the joint center O. In the constant velocity universal joint 121, as described above, curvature centers of the ball raceway center lines x and y of the paired track grooves 127 and 129 are not offset in the axial direction with respect to the joint center O. However, the paired track grooves 127 and 129 cross each other, and the balls 124 are interposed in those crossing portions. Therefore, when the joint forms an operating angle, the balls 124 are always guided in a plane bisecting an angle formed between axial lines of the outer joint member 122 and the inner joint member 123. As a result, rotational torque is transmitted at a constant velocity between the two axes.

In the above-mentioned fixed type constant velocity universal joint 121 of the track groove crossing type, the track grooves 127 of the outer joint member 122 that are adjacent to each other in the peripheral direction are inclined in the opposite directions. Further, the track grooves 129 of the inner joint member 123 that are adjacent to each other in the peripheral direction are inclined in the opposite directions. Therefore, forces in the opposite directions are applied from the balls 124 to pocket portions 125a of the cage 125 that are adjacent to each other in the peripheral direction. Due to the forces in the opposite directions, the cage 125 is stabilized at the position of the joint center O. Thus, a contact force between the spherical outer peripheral surface 132 of the cage 125 and the spherical inner peripheral surface 126 of the outer joint member 122, and a contact force between the spherical inner peripheral surface 133 of the cage 125 and the spherical outer peripheral surface 128 of the inner joint member 123 are suppressed. Accordingly, the joint is smoothly operated under high load and in high speed rotation. As a result, torque loss and heat generation are suppressed, and the durability is enhanced.

CITATION LIST

Patent Literature 1: JP 2009-250365 A

SUMMARY OF INVENTION

Technical Problems

The above-mentioned fixed type constant velocity universal joint 121 of the track groove crossing type is excellent as a joint suppressed in heat generation, but has the following problem inherent therein. Due to the structure in which the curvature center of the track groove 127 matches with the joint center O, when a large inlet chamfer 130 is formed in the outer joint member 122 as illustrated in FIG. 16b, the effective track length of the track groove 127 of the outer joint member 122 becomes insufficient. As a result, when a high operating angle θ is formed, the ball 124 may drop off the track groove 127. Thus, high operating angles cannot be formed.

Therefore, the inventors of the present invention have investigated the possibility of providing a linear part to the track groove of each joint member so as to achieve high operating angles in the above-mentioned fixed type constant velocity universal joint of the track groove crossing type. FIGS. 12a and 12b are a vertical sectional view and a front view of this constant velocity universal joint. As illustrated in FIG. 12a, in a constant velocity universal joint 141, each track groove 147 of an outer joint member 142 includes an arc-shaped track groove 147a having a curvature center at a joint center O and provided on an interior side with respect to a plane including the joint center O at an operating angle of 0° and extending in a direction orthogonal to a joint axial line n-n (joint center plane), and a linear track groove 147b provided on an opening side with respect to the joint center plane. On the other hand, each track groove 149 of an inner joint member 143 includes an arc-shaped track groove 149a having a curvature center at the joint center O and provided on the opening side with respect to the joint center plane, and a linear track groove 149b provided on the interior side with respect to the joint center plane.

In addition, as illustrated in FIG. 12b, the track grooves 147 include track grooves 147A and 147B that are inclined in a peripheral direction with respect to a joint axial line and adjacent to each other in the peripheral direction with their inclination directions opposite to each other. Further, the track grooves 149 include track grooves 149A and 149B that are inclined in the peripheral direction with respect to the joint axial line and adjacent to each other in the peripheral direction with their inclination directions opposite to each other. Balls 144 are arranged in crossing portions of the paired track grooves 147A and 149A and the paired track grooves 147B and 149B of the outer joint member 142 and the inner joint member 143. Thus, when both the joint members 142 and 143 rotate relative to each other at the operating angle of 0° as illustrated in FIGS. 12a and 12b, an opening direction of a wedge angle formed between the track grooves 147A and 149A and an opening direction of a wedge angle formed between the track grooves 147B and 149B become opposite to each other, and hence forces in the opposite directions are applied from the balls 144 to pocket portions 145a of a cage 145 that are adjacent to each other in the peripheral direction. As a result, the cage 145 is stabilized at the position of the joint center O. Thus, a contact force between a spherical outer peripheral surface 152 of the cage 145 and a spherical inner peripheral surface 146 of the outer joint member 142, and a contact force between a spherical inner peripheral surface 153 of the cage 145 and a spherical outer peripheral surface 148 of the inner joint member 143 are suppressed. Accordingly, the operability of the joint is enhanced. As a result, torque loss and heat generation are suppressed, and the durability is enhanced.

As described above, in the track groove 147 of the outer joint member 142, the linear track groove portion 147b is formed in the region on the opening side of the joint center plane. Thus, the effective track length is increased, and hence high operating angles can be formed. However, in the above-mentioned structure, it has been found that, when a frequently used operating angle is formed, there is a problem in terms of suppression of the torque loss and heat generation of the joint. The reason is described with reference to FIG. 13.

The track grooves 147 and 149 are generally held in contact with each ball 144 at a contact angle (approximately from 30° to 45°), and hence, as illustrated in FIG. 13, the track grooves 147 and 149 are held in contact with the ball 144 at positions indicated by the broken lines on side surface sides of the track grooves 147 and 149, which are slightly spaced apart from groove bottoms of the track grooves 147 and 149. When the joint forms an operating angle, wedge angle components (not shown) due to the crossing between the track grooves 147 and 149 and wedge angle components α due to expansion between the groove bottoms of the track grooves 147 and 149 in a radial direction of the joint are both applied to the balls 144. Of those wedge angle components, the wedge angle components due to the crossing between the track grooves 147 and 149 are canceled and forces are balanced because the track grooves 147 and 149 are inclined in the directions opposite to each other and hence forces in the opposite directions are applied from the balls 144 to the pocket portions 145a of the cage 145.

However, as illustrated in FIG. 13, in the case of the wedge angle components α due to the expansion between the groove bottoms of the track grooves 147 and 149 in the radial direction of the joint, the balls 144 within phase ranges of from 0° to 90° and from 270° to 360° in FIG. 12b are positioned between the linear track groove portions 147b and 149b. Due to a wedge angle component α1 opened toward the opening side, a force toward the opening side is applied to the balls 144 within those phase ranges. On the other hand, the balls 144 within a phase range of from 90° to 270° are positioned between the arc-shaped track groove portions 147a and 149a. Therefore, a wedge angle component α2, which is generated due to the expansion in the radial direction of the joint, is zero in the balls within this phase range, and hence no push-out force is generated in the balls 144. Thus, when the wedge angle components due to the crossing between the track grooves 147 and 149 and the wedge angle components α due to the expansion between the groove bottoms of the track grooves 147 and 149 in the radial direction of the joint are applied to the balls 144 in combination, the forces applied from the balls 144 to the pocket portions 145a of the cage 145 are not balanced with each other. As a result, there arises a problem in that the contact force between the spherical outer peripheral surface 152 of the cage 145 and the spherical inner peripheral surface 146 of the outer joint member 142, and the contact force between the spherical inner peripheral surface 153 of the cage 145 and the spherical outer peripheral surface 148 of the inner joint member 143 cannot be suppressed. In particular, it has been found that this problem is serious in terms of suppression of the torque loss and heat generation in a range of the frequently used operating angles including a normal operating angle.

In view of the above-mentioned problems, the present invention has an object to provide a fixed type constant velocity universal joint that is suppressed in torque loss and heat generation, enhanced in efficiency, excellent in durability, and is capable of forming high operating angles.

Solution to Problems

As a result of various investigations for achieving the above-mentioned object, the inventors of the present invention have arrived at the following novel idea. In order to suppress torque loss and heat generation and to achieve higher efficiency, an arc-shaped first track groove portion capable of forming a crossing portion (crossing track) in cooperation with a mating side is provided in each of track grooves of an outer joint member and an inner joint member so as to be adaptable to a range of frequently used operating angles, and a second track groove portion having a different shape from that of the first track groove portion is provided in each of the track grooves of both the joint members so as to be adaptable to a range of less frequently used high operating angles. In addition, the inventors of the present invention have arrived at such an idea that a curvature center of the arc-shaped first track groove portion is offset to an opening side with respect to a joint center so as to increase an effective track length at the maximum operating angle and therefore achieve high operating angles.

According to one embodiment of the present invention, which is devised to achieve the above-mentioned object, there is provided a fixed type constant velocity universal joint, comprising: an outer joint member having a spherical inner peripheral surface in which a plurality of track grooves are formed so as to extend in an axial direction of the outer joint member, the outer joint member having an opening side and an interior side spaced apart from each other in the axial direction; an inner joint member having a spherical outer peripheral surface in which a plurality of track grooves are formed so as to be paired with the plurality of track grooves of the outer joint member; a plurality of balls for transmitting torque, the plurality of balls being interposed between the plurality of track grooves of the outer joint member and the plurality of track grooves of the inner joint member; and a cage for holding the plurality of balls, the cage having a spherical outer peripheral surface and a spherical inner peripheral surface, which are fitted to the spherical inner peripheral surface of the outer joint member and the spherical outer peripheral surface of the inner joint member, respectively, wherein the plurality of track grooves of the outer joint member comprise: first track groove portions positioned on the interior side; and second track groove portions positioned on the opening side, wherein each of the first track groove portions is formed into an arc shape having a curvature center at a position offset to the opening side with respect to a joint center, wherein the first track groove portions are inclined in a peripheral direction of the outer joint member with respect to a joint axial line and adjacent to each other in the peripheral direction with their inclination directions opposite to each other, wherein each of the second track groove portions is formed into a different shape from the arc shape of the each of the first track groove portions so as to increase an effective track length at a maximum operating angle, wherein the each of the second track groove portions is connected to the each of the first track groove portions at a position on the opening side with respect to the joint center, and wherein each of the plurality of track grooves of the inner joint member is formed so as to be mirror-image symmetrical with corresponding one of the plurality of paired track grooves of the outer joint member with respect to a joint center plane at an operating angle of 0°. Note that, the "joint axial line" herein refers to a longitudinal axial line that is a joint rotation center, and corresponds to a joint axial line N-N in the embodiments described later. Further, in a strict sense, the "joint center plane at the operating angle of 0°" refers to a plane including the joint center at the operating angle of 0° and extending in a direction orthogonal to the joint axial line.

According to one embodiment of the present invention, in the plurality of track grooves of the outer joint member, the each of the second track groove portions provided on the opening side so as to increase the effective track length is connected to the each of the first track groove portions at the position on the opening side with respect to the joint center (in the plurality of track grooves of the inner joint member, the each of the second track groove portions provided on the interior side is connected to the each of the first track groove portions at a position on the interior side with respect to the joint center). This means that, in the fixed type constant velocity universal joint according to one embodiment of the present invention, the range of formation of the first track groove portions for forming crossing tracks excellent in the effect of suppressing torque loss and the like is further widened, as compared to the constant velocity universal joint 141 illustrated in FIG. 12*a*. Therefore, it is possible to suppress the torque loss and heat generation in a range of a normal operating angle and to achieve higher efficiency. On the other hand, the each of the arc-shaped first track groove portions has the curvature center offset to the opening side with respect to the joint center. When the offset amount is appropriately adjusted in such a range that the effect of suppressing torque loss and the like (efficiency of the joint), which is attained by employing the above-mentioned structure, is not deteriorated, the length of the each of the second track groove portions (effective track length) can be increased effectively and therefore high operating angles can be achieved. Thus, according to one embodiment of the present invention, it is possible to attain a fixed type constant velocity universal joint that is suppressed in torque loss and heat generation, enhanced in efficiency, excellent in durability, and is capable of forming high operating angles.

When assuming that an angle formed by a straight line connecting the joint center and a connection point between the each of the first track groove portions and the each of the second track groove portions with respect to the joint center plane at the operating angle of 0° is represented by β, the angle β is set appropriately depending on usage conditions and the like. As a result, the efficiency of the fixed type constant velocity universal joint can be enhanced appropriately. In particular, considering the range of the normal operating angle of the constant velocity universal joint for an automobile, the angle β is set to 3° to 10°, and thus the constant velocity universal joint is widely applicable to various vehicle types. Note that, the angle β is herein defined as the smallest angle among the angles formed by the above-mentioned straight line with respect to a straight line on the joint center plane at the operating angle of 0°.

As long as the curvature center of the each of the first track groove portions is offset to the opening side with respect to the joint center, the radial position of the curvature center may be set arbitrarily. That is, the curvature center of the each of the first track groove portions may be arranged on an inclined axis N'-N', which is inclined in the peripheral direction with respect to the joint axial line N-N (see FIGS. 4, 5, and the like), or may be arranged at a position offset in the radial direction with respect to the inclined axis N'-N' (see FIG. 10). When the curvature center of the each of the first track groove portions is offset in the radial direction with respect to the joint axial line, the track groove depths on the interior side of the joint can be adjusted in accordance with the offset amount, with the result that optimum track groove depths can be secured.

A curvature center of the spherical outer peripheral surface of the cage may be arranged at a position offset to the opening side with respect to the joint center, and a curvature center of the spherical inner peripheral surface of the cage may be arranged at a position offset to the interior side with respect to the joint center. With this structure, the thickness of the cage can gradually be increased as the distance to the opening side becomes smaller, and thus the strength of the cage can be secured particularly at high operating angles. As a result, the reliability of the joint can be enhanced.

The each of the second track groove portions may comprise an arc part having a curvature center at a position that is a radially outer side of the each of the first track groove portions and offset to the opening side with respect to the joint center. Thus, the effective track length can be increased and therefore the maximum operating angle can be increased. In this case, the each of the second track groove portions may comprise the above-mentioned arc part alone, and the arc part may smoothly be connected to the each of the first track groove portions. Alternatively, the each of the second track groove portions may comprise the above-mentioned arc part and a linear part, and the linear part may smoothly be connected to the each of the first track groove portions.

It is desired that the number of the plurality of balls for transmitting torque be set to eight, ten, or twelve. With this structure, it is possible to attain a fixed type constant velocity universal joint and therefore an automotive drive shaft that are lightweight and compact, enhanced in efficiency, and are capable of forming high operating angles.

Advantageous Effects of Invention

According to one embodiment of the present invention, it is possible to attain a compact fixed type constant velocity universal joint that is suppressed in torque loss and heat generation, enhanced in efficiency, excellent in durability, and is capable of forming high operating angles.

BRIEF DESCRIPTION OF DRAWINGS

FIG. 7*a* is a perspective view of the outer joint member.

FIG. 7*b* is a perspective view of the inner joint member.

DESCRIPTION OF EMBODIMENTS

Embodiments of the present invention are described with reference to the drawings.

Figure 1B:
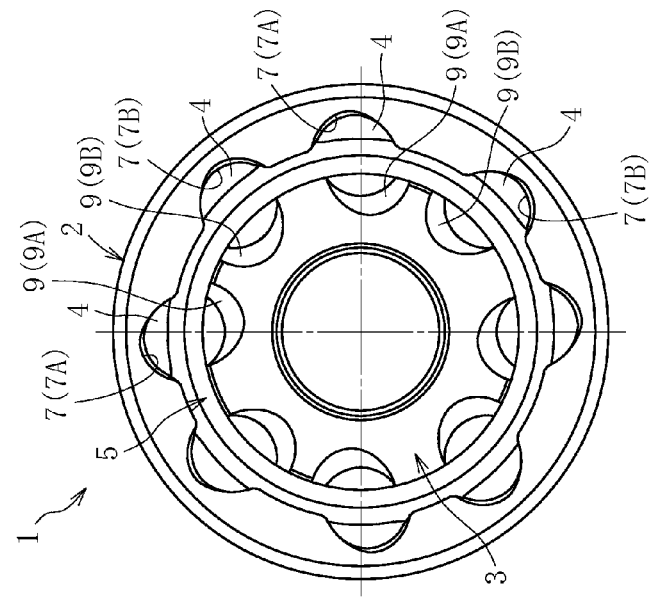
FIG. 1*b* is a front view of the fixed type constant velocity universal joint according to the first embodiment of the present invention.
Figure 1A:
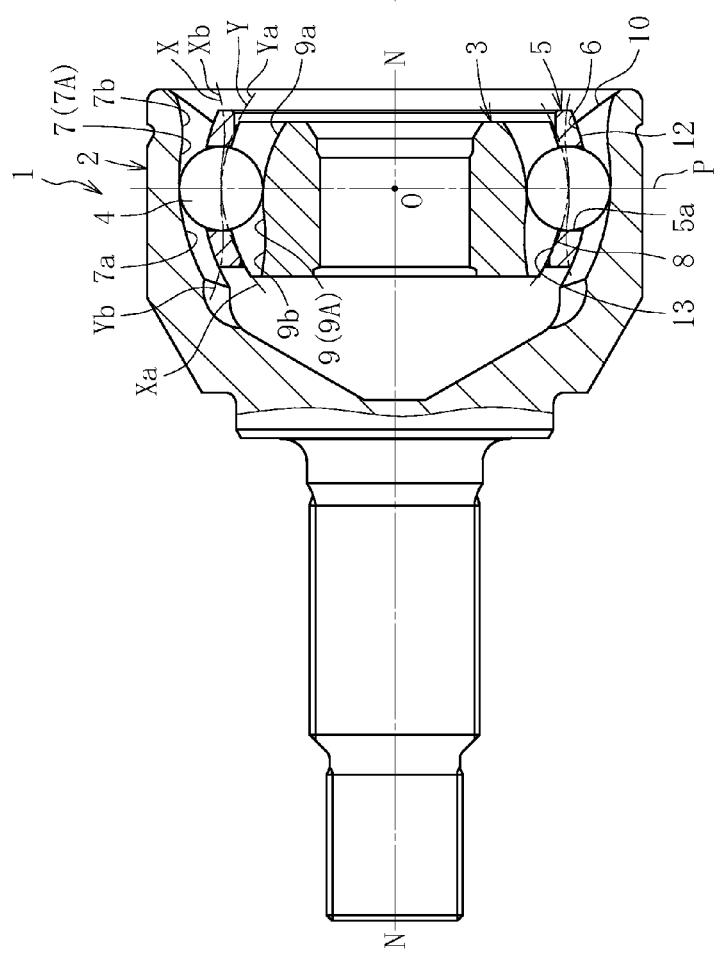
FIG. 1*a* is a partial vertical sectional view of a fixed type constant velocity universal joint according to a first embodiment of the present invention.

FIG. 1a is a partial vertical sectional view of a fixed type constant velocity universal joint 1 (hereinafter also referred to simply as "constant velocity universal joint 1") according to a first embodiment of the present invention, and FIG. 1b is a front view of the constant velocity universal joint 1 as seen from an opening side thereof. The constant velocity universal joint 1 is classified into a track groove crossing type. The constant velocity universal joint 1 mainly comprises an outer joint member 2, an inner joint member 3, balls 4, and a cage 5. As illustrated also in FIG. 2, eight track grooves 7 are formed in a spherical inner peripheral surface 6 of the outer joint member 2 so as to extend along an axial direction. The track grooves 7 comprise track grooves 7 (7A and 7B) that are inclined at an angle γ in a peripheral direction with respect to a joint axial line N-N and adjacent to each other in the peripheral direction with their inclination directions opposite to each other. As illustrated also in FIGS. 3, eight track grooves 9 are formed in a spherical outer peripheral surface 8 of the inner joint member 3 so as to extend along the axial direction. The track grooves 9 comprise track grooves 9 (9A and 9B) that are inclined at the angle γ in the peripheral direction with respect to the joint axial line N-N and adjacent to each other in the peripheral direction with their inclination directions opposite to each other. In addition, each ball 4 is arranged in a crossing portion between the paired track grooves 7 and 9 of the outer joint member 2 and the inner joint member 3. Details of the track grooves 7 (7A and 7B) of the outer joint member 2 and the track grooves 9 (9A and 9B) of the inner joint member 3 are described later.

The term "ball raceway center line" is hereinafter used to accurately describe the form (such as an inclined state and a curved state) and the shape of the track grooves 7 and 9. The ball raceway center line refers to a trajectory of the center of the ball 4 interposed between the paired track grooves 7 and 9 at the time of moving along the track grooves 7 and 9. Thus, the inclined state and the curved state of the track grooves 7 and 9 correspond to an inclined state and a curved state of the ball raceway center lines thereof.

Each track groove 7 of the outer joint member 2 has a ball raceway center line X. Specifically, the track groove 7 comprises a first track groove portion 7a provided on an interior side and having an arc-shaped ball raceway center line Xa about a curvature center at a point $O_{o1}$ offset by a dimension $f_1$ (see FIG. 4) to the opening side with respect to a joint center O, and a second track groove portion 7b provided on the opening side and having an arc-shaped ball raceway center line Xb curved in an opposite direction to that of the first track groove portion 7a. That is, the second track groove portion 7b according to this embodiment comprises only an arc part having a different shape from (curved in an opposite direction to) that of the first track groove portion 7a, and the ball raceway center line Xb of the second track groove portion 7b (end portion on the interior side of the ball raceway center line Xb) is smoothly connected to an end portion on the opening side of the ball raceway center line Xa of the first track groove portion 7a. Further, the offset point $O_{o1}$ corresponding to the curvature center of the first track groove portion 7a is arranged on an inclined axis N'-N', which is inclined at the angle γ with respect to the joint axial line N-N (see FIG. 4; for the angle γ, see FIG. 2a), and is not offset in a radial direction with respect to the joint center O.

Figure 2A:
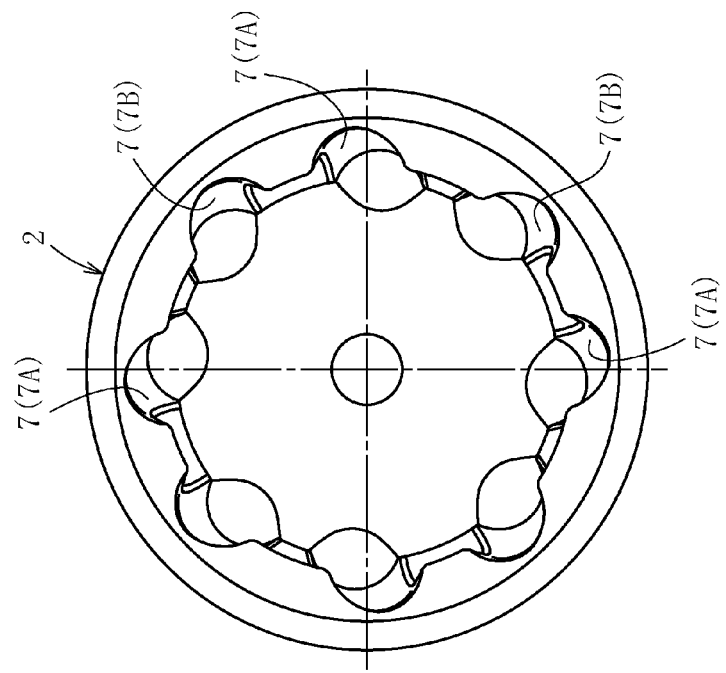
FIG. 2*a* is a partial vertical sectional view of an outer joint member.
Figure 2B:
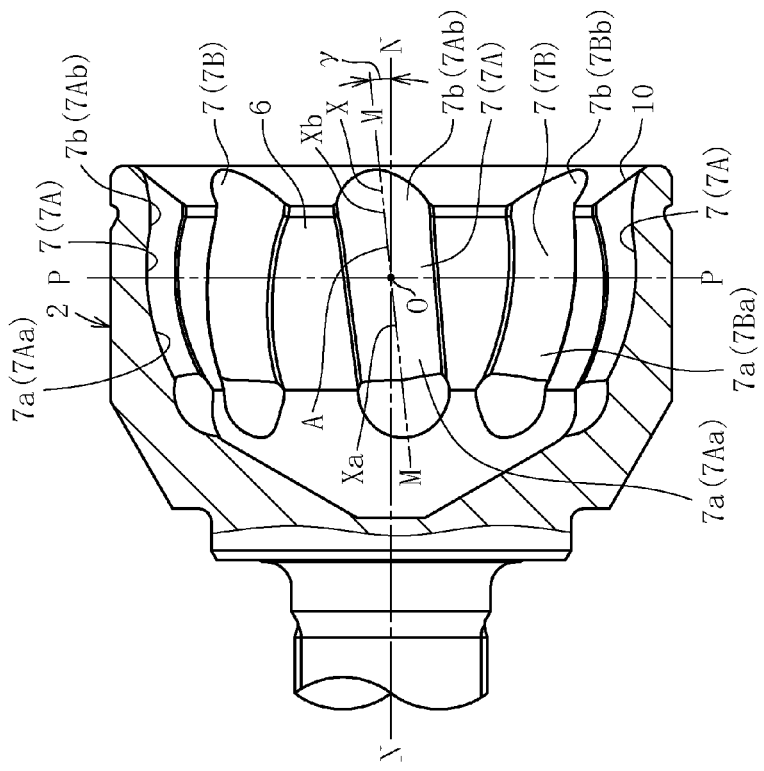
FIG. 2*b* is a front view of the outer joint member.

Referring to FIG. 2a, which is a partial vertical sectional view of the outer joint member 2, and to FIG. 2b, which is a front view (right-hand side view) of the outer joint member 2 as seen from the opening side, detailed description is given of a state in which the track grooves 7 of the outer joint member 2 are inclined at the angle γ in the peripheral direction with respect to the joint axial line N-N. The track grooves 7 of the outer joint member 2 are represented by the reference symbols 7A and 7B to indicate a difference in inclination direction thereof. As illustrated in FIG. 2a, a plane M including the ball raceway center line X of each track groove 7A and the joint center O is inclined at an angle γ with respect to the joint axial line N-N. In addition, although illustration is omitted, each track groove 7B adjacent to the track groove 7A in the peripheral direction is inclined at an angle γ with respect to the joint axial line N-N in an opposite direction to the inclination direction of the track groove 7A. In this embodiment, the entire ball raceway center line X of the track groove 7A (and 7B), that is, both the ball raceway center line Xa of the first track groove portion 7a and the ball raceway center line Xb of the second track groove portion 7b are formed in the plane M. However, the present invention is not limited thereto, and there may be employed such an embodiment that only the ball raceway center line Xa of the first track groove portion 7a is included in the plane M. Thus, it is only necessary that the planes M including at least the ball raceway center line Xa of the first track groove portion 7a and the joint center O be inclined at the angle γ in the peripheral direction with respect to the joint axial line N-N with their inclination directions opposite to each other in the first track groove portions 7a adjacent to each other in the peripheral direction.

Now, supplementary description is given of the reference symbols of the track grooves. Reference symbol 7 represents the track grooves of the outer joint member 2 as a whole, and reference symbols 7a and 7b represent the first and second track groove portions. Further, reference symbols 7A and 7B represent the track grooves to distinguish the difference in inclination direction thereof, reference symbols 7Aa and 7Ba represent first track groove portions of the respective track grooves 7A and 7B, and reference symbols 7Ab and 7Bb represent second track groove portions of the respective track grooves 7A and 7B. The track grooves 9 of the inner joint member 3 described later in detail are represented by the reference symbols in a similar manner.

Each track groove 9 of the inner joint member 3 has a ball raceway center line Y. Specifically, the track groove 9 comprises a first track groove portion 9a having an arc-shaped ball raceway center line Ya about a curvature center at a point $O_{i1}$ offset by the dimension $f_1$ (see FIG. 5) to the interior side with respect to the joint center O, and a second track groove portion 9b provided on the interior side and having an arc-shaped ball raceway center line Yb curved in an opposite direction to that of the first track groove portion 9a. That is, the second track groove portion 9b according to this embodiment comprises only an arc part having a different shape from (curved in an opposite direction to) that of the first track groove portion 9a, and an end portion on the opening side of the ball raceway center line Yb of the second track groove portion 9b is smoothly connected to an end portion on the interior side of the ball raceway center line Ya of the first track groove portion 9a. Further, the offset point $O_{i1}$ corresponding to the curvature center of the first track groove portion 9a is arranged on the inclined axis N'-N', which is inclined at the angle γ with respect to the joint axial line N-N (see FIG. 5; for the angle γ, see FIG. 3b), and is not offset in the radial direction with respect to the joint center O.

Figure 3C:
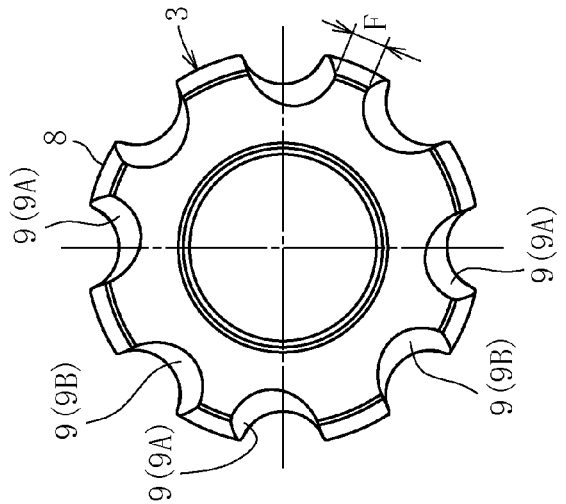
FIG. 3*c* is a front view of the inner joint member.
Figure 3B:
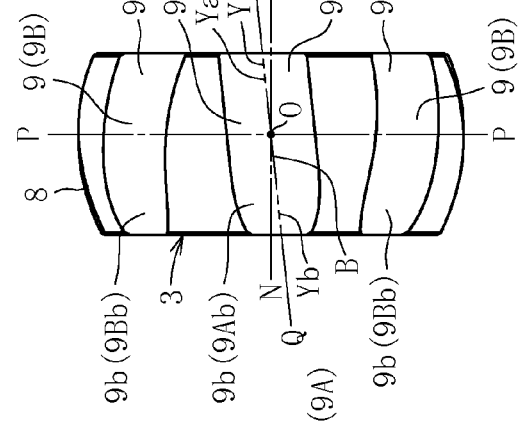
FIG. 3*b* is a side view of the inner joint member.
Figure 3A:
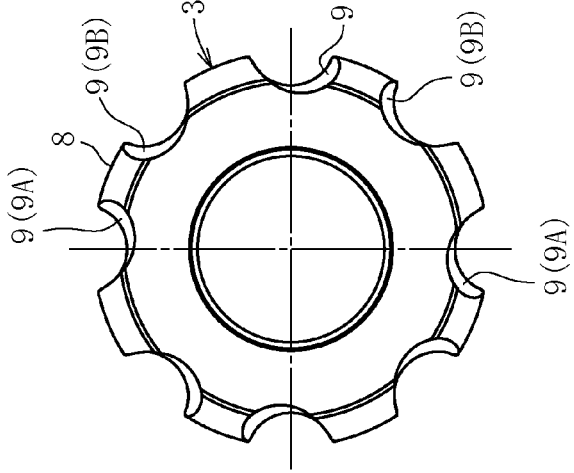
FIG. 3*a* is a rear view of an inner joint member.

Next, referring to FIGS. 3a to 3c, which are a rear view, a side view, and a front view of the inner joint member 3, detailed description is given of a state in which the track grooves 9 of the inner joint member 3 are inclined in the peripheral direction with respect to the joint axial line N-N. The track grooves 9 of the inner joint member 3 are represented by the reference symbols 9A and 9B to indicate a difference in inclination direction thereof. As illustrated in FIG. 3b, a plane Q including the ball raceway center line Y of each track groove 9A and the joint center O is inclined at an angle γ with respect to the joint axial line N-N. In addition, although illustration is omitted, in the case of each track groove 9B adjacent to the track groove 9A in the peripheral direction, a plane Q including the ball raceway center line Y of the track groove 9B and the joint center O is inclined at an angle γ with respect to the joint axial line N-N in an opposite direction to the inclination direction of the track groove 9A. The inclination angle γ of the plane Q (and the plane M described above) with respect to the joint axial line N-N is preferably 4° to 12° in consideration of operability of the constant velocity universal joint 1 and a spherical width F between the closest sides of the track grooves 9 of the inner joint member 3. Further, similarly to the outer joint member 2 described above, in this embodiment, the entire ball raceway center line Y of the track groove 9A, that is, both the ball raceway center line Ya of the first track groove portion 9a and the ball raceway center line Yb of the second track groove portion 9b are formed in the plane Q. However, the present invention is not limited thereto, and may be carried out in such an embodiment that only the ball raceway center line Ya of the first track groove portion 9a is included in the plane Q. Thus, it is only necessary that the planes Q including at least the ball raceway center line Ya of the first track groove portion 9a and the joint center O be inclined in the peripheral direction with respect to the joint axial line N-N with their inclination directions opposite to each other in the first track groove portions 9a adjacent to each other in the peripheral direction.

With the above-mentioned structure, the ball raceway center line Y of the track groove 9 of the inner joint member 3 is formed so as to be mirror-image symmetrical with the ball raceway centerline X of the paired track groove 7 of the outer joint member 2 with respect to a joint center plane P at an operating angle of 0°. Note that, although illustration is omitted, the track grooves 7 and 9 of both the joint members 2 and 3 are formed into an elliptical shape or a Gothic arch shape in horizontal cross section, and the track grooves 7 and 9 are held in so-called angular contact with each ball 4 at a contact angle of approximately from 30° to 45°. Thus, the ball 4 is held in contact with the track grooves 7 and 9 on their side surface sides, which are slightly spaced apart from groove bottoms of the track grooves 7 and 9.

Figure 4:
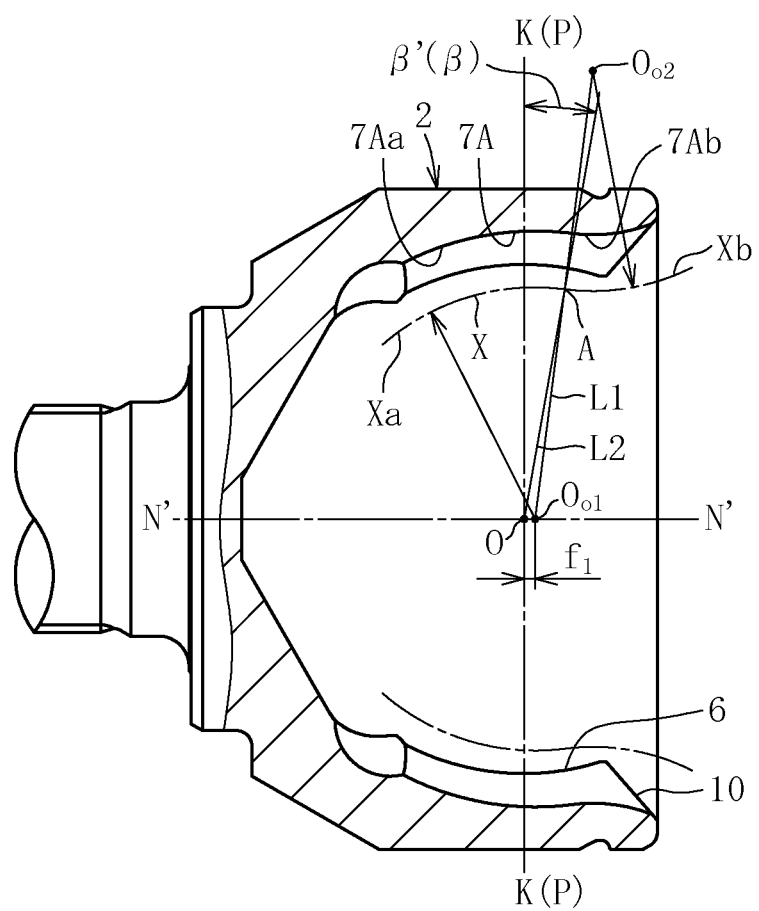
FIG. 4 is a partial vertical sectional view of details of track grooves of the outer joint member.

Next, referring to FIG. 4, which is a partial vertical sectional view of the outer joint member 2, detailed description is given of the track grooves in the view take along the vertical cross section of the outer joint member 2. FIG. 4 is a sectional view taken along the plane M of FIG. 2a including the ball raceway center line X of the track groove 7A and the joint center O. Thus, in a strict sense, FIG. 4 is not a vertical sectional view in the plane including the joint axial line N-N, but is a view of a vertical cross section in the plane including the inclined axis N'-N', which is inclined at the angle γ with respect to the joint axial line N-N. Further, FIG. 4 only illustrates the track groove 7A of the outer joint member 2, and detailed description with reference to illustration of the track groove 7B is omitted because the inclination direction of the track groove 7B is opposite to that of the track groove 7A and other structural details of the track groove 7B are the same as those of the track groove 7A.

In the spherical inner peripheral surface 6 of the outer joint member 2, the track grooves 7A each having the ball raceway center line X are formed along the axial direction. Each track groove 7A comprises the first track groove portion 7Aa having the arc-shaped ball raceway center line Xa about a curvature center at the point $O_{o1}$ offset by the dimension $f_1$ to the opening side with respect to the joint center O, and the second track groove portion 7Ab having the arc-shaped ball raceway center line Xb curved in an opposite direction to that of the first track groove portion 7Aa, more specifically, the arc-shaped ball raceway center line Xb about a curvature center at a point $O_{o2}$ positioned on a radially outer side of the first track groove portion 7Aa and larger in offset amount than the offset point $O_{o1}$. That is, the second track groove portion 7Ab comprises only an arc part, and an end portion on the interior side of the ball raceway center line Xb of the second track groove portion 7Ab is smoothly connected to an end portion A on the opening side of the ball raceway center line Xa of the first track groove portion 7Aa (crossing point between a straight line L1 connecting both the offset points $O_{o1}$ and $O_{o2}$ and the ball raceway center line X of the track groove 7A). When assuming that L2 represents a straight line connecting the end portion A on the opening side of the first track groove portion 7Aa and the joint center O, a plane including an angle β' formed between the straight line L2 and a perpendicular line K at the joint center O, which is perpendicular to the joint axial line N'-N' projected onto the plane M (see FIG. 2a) including the ball raceway center line X of the track groove 7A and the joint center O, is inclined at the angle γ with respect to the joint axial line N-N. The above-mentioned perpendicular line K is formed in the joint center plane P at the operating angle of 0°. Thus, an angle β formed by the straight line L2 with respect to the joint center plane P at the operating angle of 0° satisfies a relationship of sin β=sin β'×cos γ. In this embodiment, each of the first track groove portion 7Aa and the second track groove portion 7Ab of the outer joint member 2 is formed of a single arc part, but the present invention is not limited thereto. Each of the first track groove portion 7Aa and the second track groove portion 7Ab of the outer joint member 2 may be formed of a plurality of arc parts in consideration of the track groove depths and the like.

Figure 5:
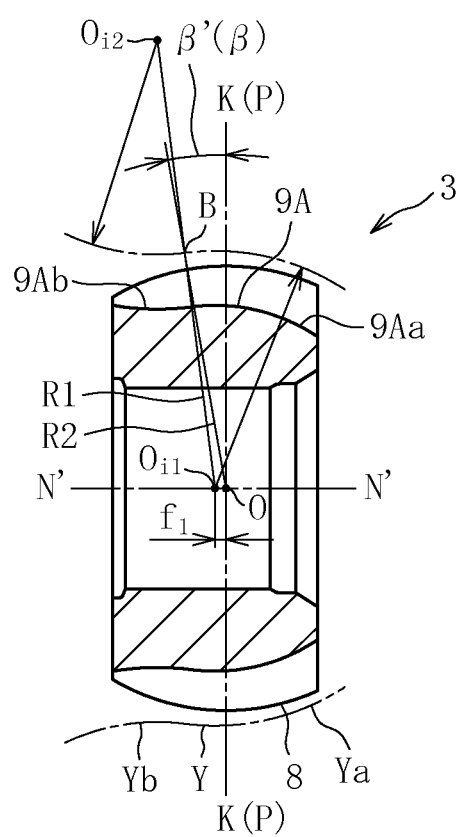
FIG. 5 is a vertical sectional view of details of track grooves of the inner joint member.

Similarly, referring to FIG. 5, detailed description is given of the track grooves in the vertical cross section of the inner joint member 3. FIG. 5 is a sectional view taken along the plane Q of FIG. 3b including the ball raceway center line Y of the track groove 9A and the joint center O. Thus, similarly to FIG. 4, in a strict sense, FIG. 5 is not a vertical sectional view in the plane including the joint axial line N-N, but is a view of a cross section in the plane including the inclined axis N'-N', which is inclined at the angle γ with respect to the joint axial line N-N. Further, FIG. 5 only illustrates the track groove 9A of the inner joint member 3, and detailed description with reference to illustration of the track groove 9B is omitted because the inclination direction of the track groove 9B is opposite to that of the track groove 9A and other structural details of the track groove 9B are the same as those of the track groove 9A.

In the spherical outer peripheral surface 8 of the inner joint member 3, the track grooves 9A each having the ball raceway center line Y are formed along the axial direction. Each track groove 9A comprises the first track groove portion 9Aa having the arc-shaped ball raceway center line Ya about a curvature center at the point $O_{i1}$ offset by the dimension $f_1$ to the interior side with respect to the joint center O, and the second track groove portion 9Ab having the arc-shaped ball raceway center line Yb curved in an opposite direction to that of the first track groove portion 9Aa, more specifically, the arc-shaped ball raceway center line Yb about a curvature center at a point $O_{i2}$ positioned on a radially outer side of the ball raceway center line Ya of the first track groove portion 9Aa and larger in offset amount than the offset point $O_{i1}$. That is, the second track groove portion 9Ab comprises only an arc part, and an end portion on the opening side of the ball raceway center line Yb of the second track groove portion 9Ab is smoothly connected to an end portion B on the interior side of the ball raceway center line Ya of the first track groove portion 9Aa (crossing point between a straight line R1 connecting both the offset points $O_{i1}$ and $O_{i2}$ and the ball raceway center line Y of the track groove 9A). When assuming that R2 represents a straight line connecting the end portion B on the interior side of the first track groove portion 9Aa and the joint center O, a plane including an angle β' formed between the straight line R2 and a perpendicular line K at the joint center O, which is perpendicular to the joint axial line N'-N' projected onto the plane Q (see FIG. 3b) including the ball raceway center line Y of the track groove 9A and the joint center O, is inclined at the angle γ with respect to the joint axial line N-N. The above-mentioned perpendicular line K is formed in the joint center plane P at the operating angle of 0°. Thus, an angle β formed by the straight line R2 with respect to the joint center plane P at the operating angle of 0° satisfies a relationship of $\sin β = \sin β' \times \cos γ$. In this embodiment, each of the first track groove portion 9Aa and the second track groove portion 9Ab of the inner joint member 3 is formed of a single arc part, but similarly to the above-mentioned track grooves of the outer joint member 2, both the track groove portions 9Aa and 9Ab may be formed of a plurality of arcs in consideration of the track groove depths and the like.

Next, description is given of the angle β formed by each of the straight lines L2 and R2 with respect to the joint center plane P at the operating angle of 0°. At an operating angle θ, each ball 4 moves by θ/2 with respect to the above-mentioned plane P in the outer joint member 2 and the inner joint member 3. The angle β is determined based on ½ of a frequently used operating angle, and a contact range of the track groove for the ball 4 is determined within a range of the frequently used operating angle. Now, the frequently used operating angle is defined. First, the normal angle of the joint refers to an operating angle to be formed in a fixed type constant velocity universal joint of a front drive shaft of an automobile with one person onboard when the steering of the automobile is switched to a straightforward mode on a horizontal and flat road surface. In general, the normal angle is selected and determined within a range of from 2° to 15° in accordance with design conditions for vehicle types. In addition, the frequently used operating angle refers to an operating angle to be formed in the fixed type constant velocity universal joint of the above-mentioned automobile during, for example, continuous travel on a curved road, instead of a high operating angle to be formed at the time of, for example, right and left turns at a traffic intersection. This operating angle is also determined in accordance with the design conditions for vehicle types. The frequently used operating angle is supposed to be 20° at maximum. Thus, the angle 13 formed by each of the straight lines L2 and R2 with respect to the joint center plane P at the operating angle of 0° is set to 3° to 10°. Note that, the angle β is not limited to 3° to 10°, and may be set appropriately in accordance with the design conditions for vehicle types. When the angle β is set to 3° to 10°, the fixed type constant velocity universal joint of this embodiment is widely applicable to various vehicle types.

Referring to FIG. 4, due to the above-mentioned angle β, the end portion A on the opening side of the ball raceway center line Xa of the first track groove portion 7Aa corresponds to a center position of the ball 4 that is moved to the end of the opening side along the axial direction at the frequently used operating angle. Similarly, referring to FIG. 5 in the case of the inner joint member 3, the end portion B on the interior side of the ball raceway center line Ya of the first track groove portion 9Aa corresponds to a center position of the ball 4 that is moved to the end of the interior side along the axial direction at the frequently used operating angle. With this setting, within the range of the frequently used operating angles, the balls 4 are positioned within the range of the first track groove portions 7Aa and 9Aa of the outer joint member 2 and the inner joint member 3 and the first track groove portions 7Ba and 9Ba that are inclined in the opposite directions to those of the first track groove portions 7Aa and 9Aa (see FIGS. 2 and 3), that is, within a range of crossing tracks.

In this case, forces in opposite directions are applied from the balls 4 to pocket portions 5a of the cage 5 that are adjacent to each other in the peripheral direction, and hence, when the curvature centers of the first track groove portions 7a and 9a of both the joint members 2 and 3 are positioned at the joint center O, the cage 5 is stabilized at the position of the joint center O. When the cage 5 is stabilized at the position of the joint center O, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are minimized. Accordingly, smooth operability of the joint is secured under high load and in high speed rotation, and hence torque loss and heat generation are suppressed effectively. As a result, it is possible to achieve higher efficiency.

However, in a case where the second track groove portion 7b having a different shape from that of the first track groove portion 7a is provided (in particular, in a case where the second track groove portion 7b having an arc shape curved in an opposite direction to that of the first track groove portion 7a as in this embodiment is provided) on the opening side of each track groove 7 of the outer joint member 2 so as to increase an effective track length and therefore achieve high operating angles, when the curvature centers of the first track groove portions 7a and 9a of both the joint members 2 and 3 are arranged at the joint center O, there may arise a restriction on achieving even higher operating angles. The reason is described in detail with reference to FIG. 14.

Figure 14:
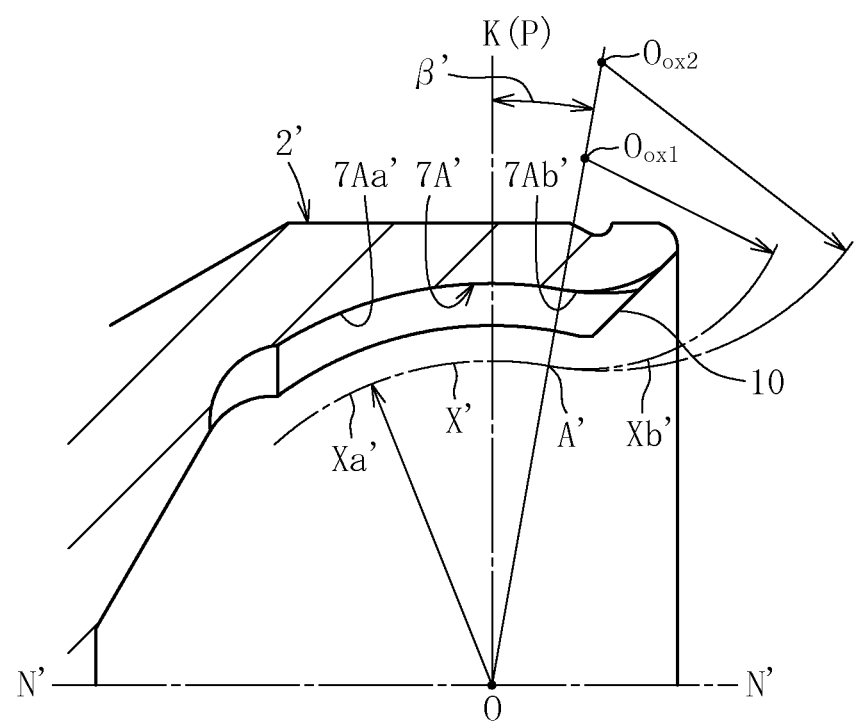
FIG. 14 is a view illustrating the technical findings in the process to arrive at the present invention.
Figure 15A:
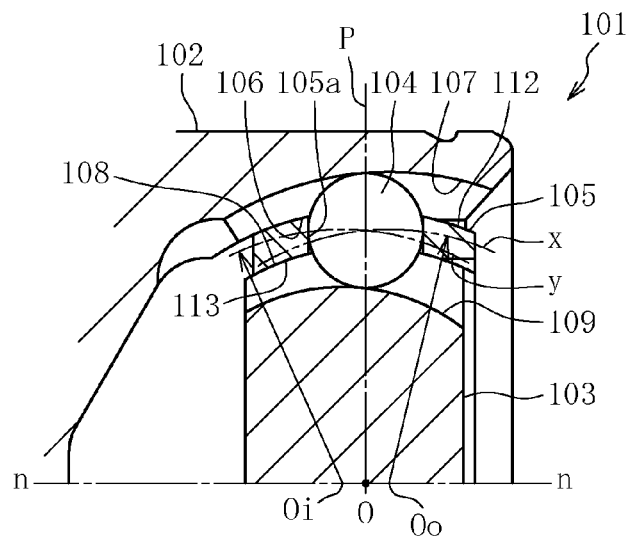
FIG. 15a is a vertical sectional view of a related-art fixed type constant velocity universal joint.
Figure 15B:
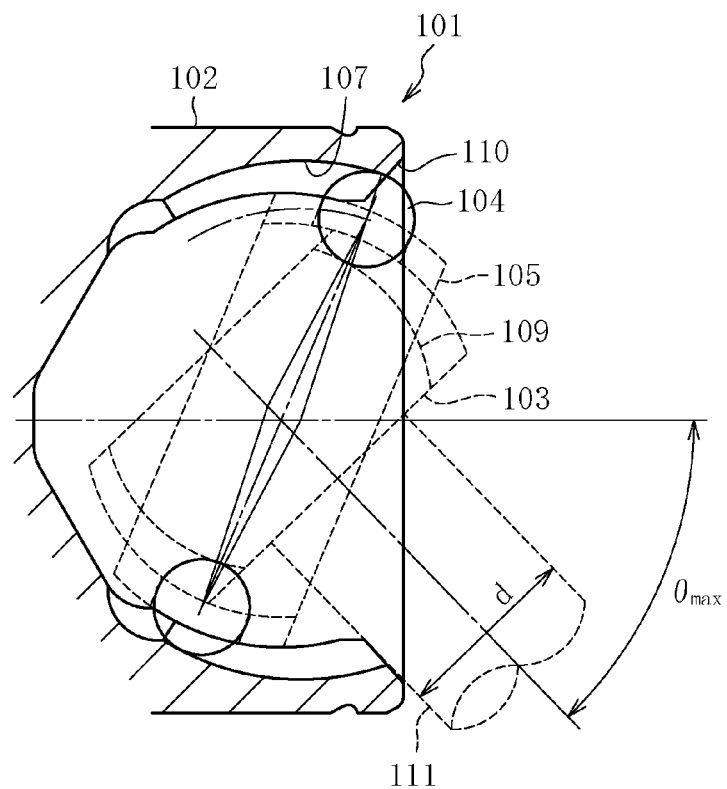
FIG. 15b is a schematic view of a state in which the fixed type constant velocity universal joint illustrated in FIG. 15a forms a maximum operating angle.
Figure 16A:
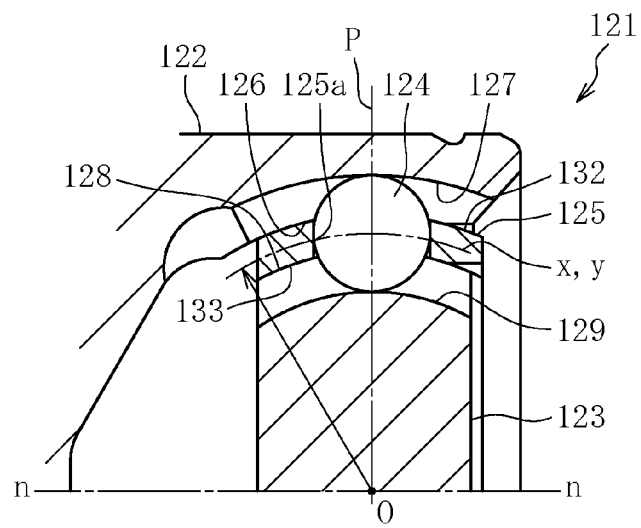
FIG. 16a is a vertical sectional view of another related-art fixed type constant velocity universal joint.
Figure 16B:
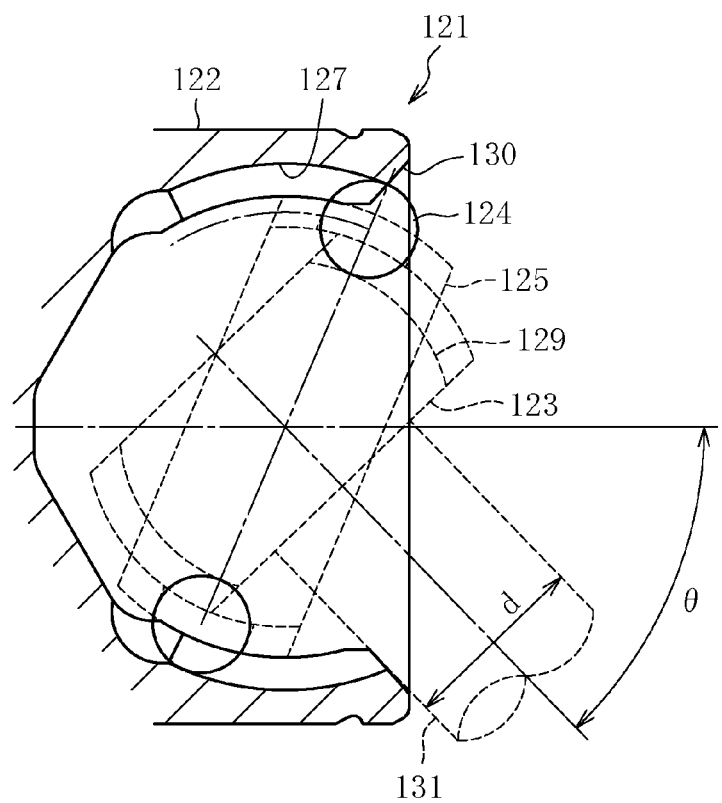
FIG. 16b is a schematic view of a state in which the fixed type constant velocity universal joint illustrated in FIG. 16a forms a high operating angle.

FIG. 14 is a sectional view of a main part of an outer joint member having track grooves 7A' formed in a spherical inner peripheral surface thereof, each of which includes a first track groove portion 7Aa' having an arc-shaped ball raceway center line Xa' about a curvature center at the joint center O, and a second track groove portion 7Ab' having an arc-shaped ball raceway center line Xb' curved in an opposite direction to that of the first track groove portion 7Aa' and smoothly connected to an end portion A' on the opening side of the first track groove portion 7Aa' (ball raceway center line Xa'). Note that, the position of the end portion A' on the opening side of the first track groove portion 7Aa' (angle β') is the same as that of the outer joint member 2 of the above-mentioned constant velocity universal joint 1 according to the first embodiment of the present invention. Further, although illustration is omitted, on an inner periphery of an outer joint member 2' illustrated in FIG. 14, there is provided an inner joint member having track grooves formed in a spherical outer peripheral surface thereof so as to be mirror-image symmetrical with the paired track grooves 7A' of the outer joint member 2' with respect to the joint center plane P at the operating angle of 0°.

In this case, the effective track length can be increased effectively when the length of the second track groove portion 7Ab' of the outer joint member 2' is maximized (when the curvature radius of the second track groove portion 7Ab' is minimized). That is, when assuming that the angle of an inlet chamfer 10 provided at an opening end of the outer joint member 2' is determined, the length of the second track groove portion 7Ab' (effective track length) can further be increased in a case where the curvature center of the second track groove portion 7Ab' (ball raceway center line Xb') is arranged at an offset point $O_{ox1}$ in FIG. 14 than in a case where the curvature center is arranged at an offset point $O_{ox2}$ in FIG. 14. However, as the curvature radius of the second track groove portion 7Ab' becomes smaller, a wedge angle formed between the track groove 7A' of the outer joint member 2' and the paired track groove of the inner joint member becomes larger when the joint forms a high operating angle, and therefore the force for pushing out the ball to the opening side is increased. Thus, the load on the pocket portion 5a of the cage 5 is increased, with the result that the durability and the strength of the joint are decreased.

Figure 6A:
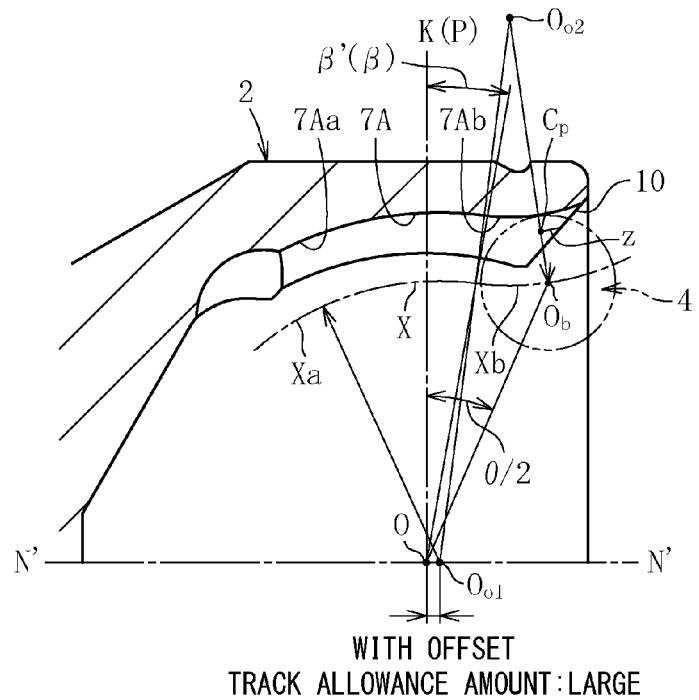
FIG. 6*a* is a schematic view of a state in which the constant velocity universal joint illustrated in FIG. 1 forms a maximum operating angle.

In order to prevent such a problem to the extent possible, according to the present invention, as described above, the curvature center of the first track groove portion 7a of the outer joint member 2 is positioned at the point $O_{o1}$ offset to the opening side with respect to the joint center O. With this structure, under the same design conditions except for the position of the curvature center of the first track groove portion, the curvature center of the second track groove portion can be positioned closer to the interior side (see the position of the offset point $O_{o2}$ corresponding to the curvature center of the second track groove portion 7Ab illustrated in FIG. 6a and the position of an offset point $O_{o2}'$ corresponding to the curvature center of the second track groove portion 7Ab' illustrated in FIG. 6b) in a case where the present invention illustrated in FIG. 6a is applied, as compared to the structure illustrated in FIG. 6b (the same structure as in FIG. 14, in which the curvature center of the first track groove portion 7Aa' of the outer joint member 2' is arranged at the joint center O). Thus, a track allowance amount can be increased. The "track allowance amount" herein refers to a dimension z from a contact point $C_p$ between the ball 4 and the track groove 7 (7') of the outer joint member 2 (2') at the time when the joint forms an operating angle θ (in FIGS. 6a and 6b, the maximum operating angle) to an edge portion of the inlet chamfer 10 of the outer joint member 2 (2'). Specifically, the "track allowance amount" herein refers to a distance from the contact point $C_p$ to a crossing point between a trajectory of the contact point and the edge portion of the inlet chamfer 10. Thus, as the track allowance amount is larger, the structure is less liable to cause the ball to drop off the track groove, which is advantageous in increasing the maximum operating angle of the joint.

Figure 6B:
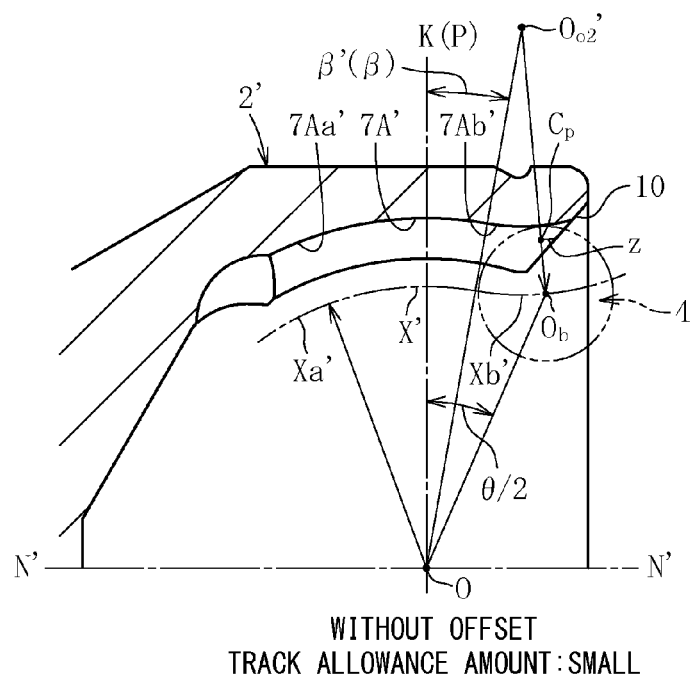
FIG. 6*b* is a schematic view of a state in which a constant velocity universal joint illustrated in FIG. 14 forms a maximum operating angle.

Note that, the track allowance amount is described in more detail. When the joint forms the maximum operating angle θ, as illustrated in FIGS. 6a and 6b, a straight line connecting a center point $O_b$ of the ball 4 and the joint center O is inclined at θ/2 with respect to the joint center plane P. At this time, the track allowance amount corresponds to the dimension z from the contact point $C_p$ between the ball and the track groove to the edge portion of the inlet chamfer 10. The track allowance amount (dimension z) is further increased in the embodiment of the present invention illustrated in FIG. 6a, as compared to the comparative structure illustrated in FIG. 6b.

Therefore, the second track groove portion 7b (7Ab, 7Bb) having the arc-shaped ball raceway center line Xb curved in an opposite direction to that of the ball raceway center line Xa of the first track groove portion 7a (7Aa, 7Ba) is provided on the opening side of the track groove 7 (7A, 7B) of the outer joint member 2, and the curvature center of the first track groove portion 7a (7Aa, 7Ba) is positioned at the point $O_{o1}$ offset to the opening side with respect to the joint center O. As a result, a large track allowance amount can be secured so that the maximum operating angle of the joint can be increased.

Figure 12:
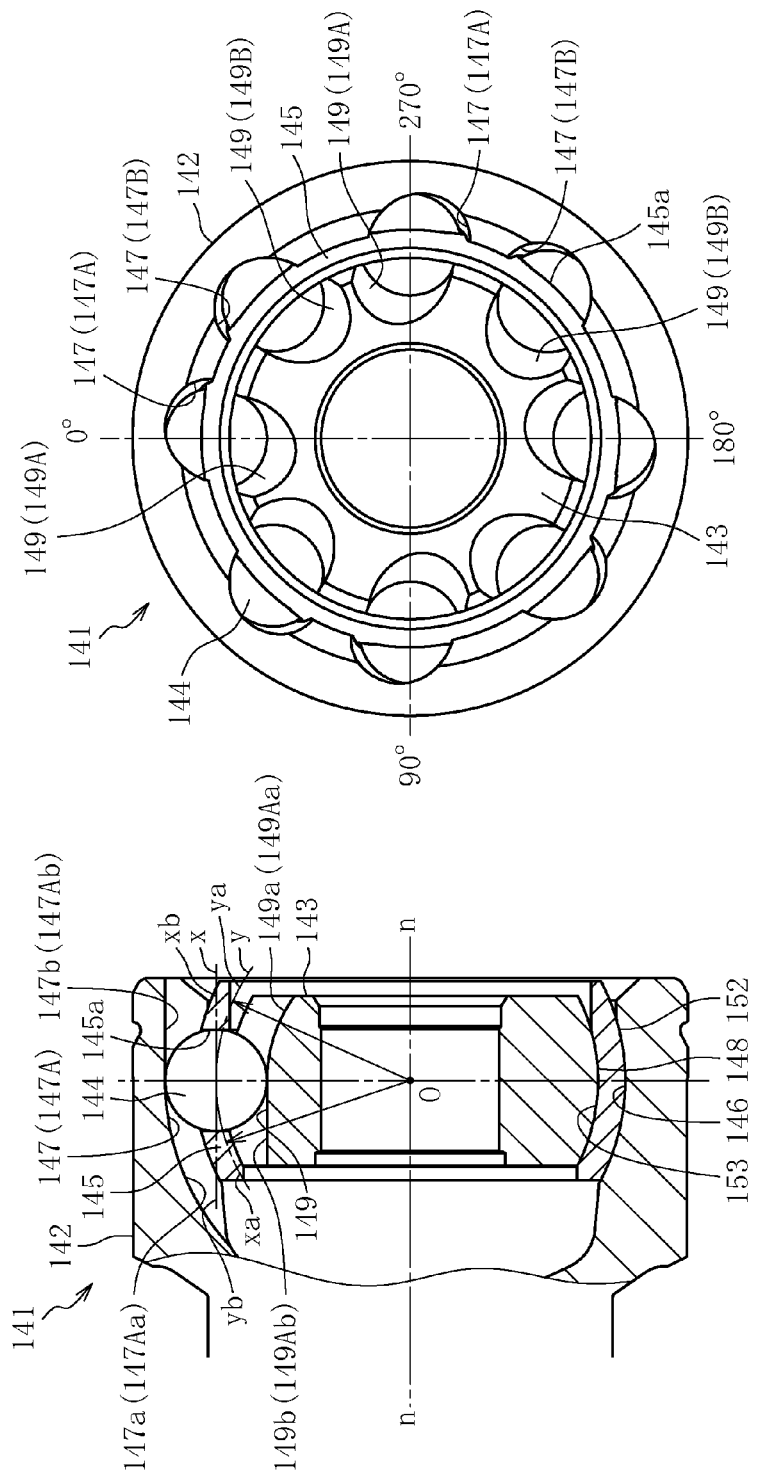
FIG. 12a is a partial vertical sectional view of a fixed type constant velocity universal joint that is investigated in the process to arrive at the present invention.
FIG. 12b is a right-hand side view of the fixed type constant velocity universal joint that is investigated in the process to arrive at the present invention.
Figure 13:
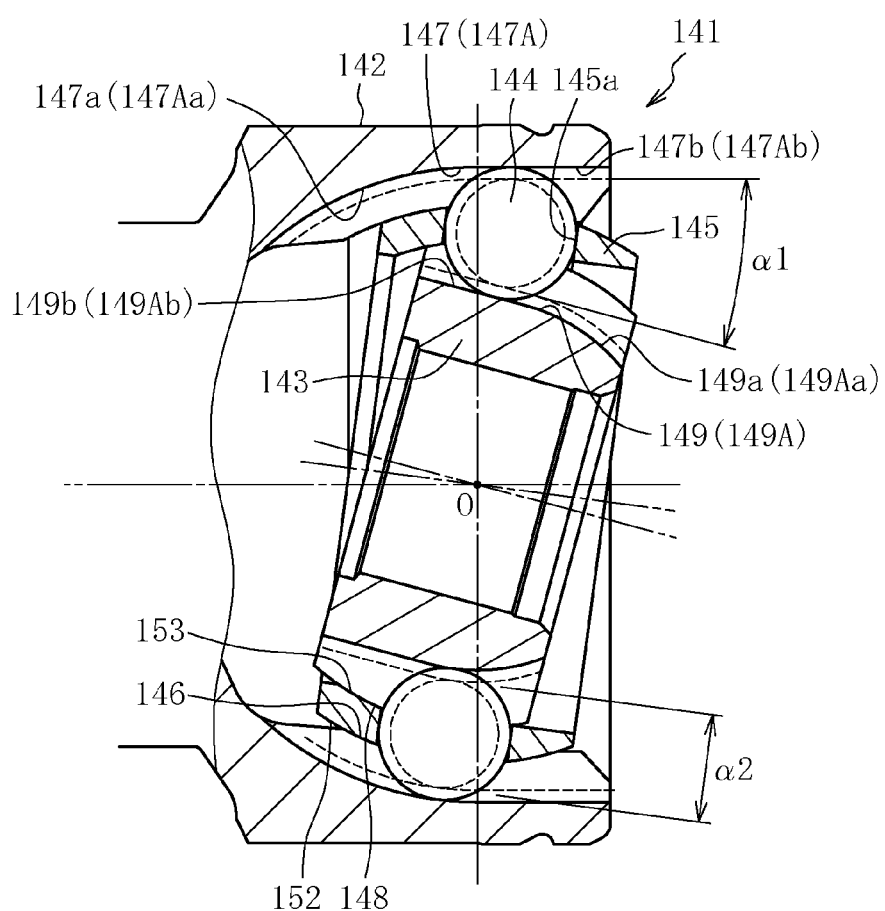
FIG. 13 is a partial sectional view of a state in which the fixed type constant velocity universal joint illustrated in FIG. 12a forms an operating angle, for illustrating technical findings in the process to arrive at the present invention.

Note that, as the offset amount of the curvature center of each of the first track groove portions 7a and 9a with respect to the joint center O becomes larger, the effect of suppressing torque loss and heat generation is weakened (the efficiency of the joint is decreased). When the offset amount of each of the first track groove portions 7a and 9a is adjusted to the extent that the effect of suppressing torque loss and the like is not excessively weakened, the effect of suppressing torque loss and the like, which is attained due to the crossing track structure adapted to a range of frequently used normal angles of the joint, becomes greater to compensate for the disadvantage caused by the offset of the curvature center of each of the first track groove portions 7a and 9a in the axial direction with respect to the joint center O. Further, in the structure of the constant velocity universal joint 1 according to the present invention, in a range of high operating angles, the balls 4 arranged in the peripheral direction are temporarily separately positioned between the first track groove portions and between the second track groove portions. Along with this, the forces applied from the balls 4 to the pocket portions 5a of the cage 5 are not balanced with each other, and hence the contact forces are generated in the contact portion between the spherical outer peripheral surface 12 of the cage 5 and the spherical inner peripheral surface 6 of the outer joint member 2, and in the contact portion between the spherical inner peripheral surface 13 of the cage 5 and the spherical outer peripheral surface 8 of the inner joint member 3. However, the angles in the range of high operating angles are used less frequently. Thus, the constant velocity universal joint 1 according to the present invention is comprehensively capable of suppressing the torque loss and heat generation more effectively, as compared to the constant velocity universal joint 141 illustrated in FIG. 12. As described above, according to the present invention, it is possible to attain a fixed type constant velocity universal joint that is suppressed in torque loss and heat generation, enhanced in efficiency, excellent in durability, and is capable of forming high operating angles.

Note that, in the constant velocity universal joint 1 according to this embodiment, the balls 4 may be fitted into the pocket portions 5a of the cage 5 with a clearance. In this case, it is preferred that the size of the clearance be set to approximately 0 μm to 40 μm. When the balls 4 are fitted into the pocket portions 5a with the clearance, the balls 4 held in the pocket portions 5a of the cage 5 can smoothly be operated, and hence the torque loss can further be suppressed.

FIGS. 7a and 7b are perspective views of the outer joint member 2 and the inner joint member 3 that are components of the above-mentioned constant velocity universal joint 1. Those perspective views illustrate the above-mentioned track grooves in a three-dimensional manner. As illustrated in FIG. 7a, the track grooves 7A and 7B inclined in the peripheral direction with respect to the joint axial line N-N (not shown) are alternately formed in the spherical inner peripheral surface 6 of the outer joint member 2 with their inclination directions opposite to each other. Each track groove 7A comprises the first track groove portion 7Aa and the second track groove portion 7Ab, and each track groove 7B comprises the first track groove portion 7Ba and the second track groove portion 7Bb. The inlet chamfer 10 is provided at the opening end of the outer joint member 2. Further, as illustrated in FIG. 7b, the track grooves 9A and 9B inclined in the peripheral direction with respect to the joint axial line N-N (not shown) are alternately formed in the spherical outer peripheral surface 8 of the inner joint member 3 with their inclination directions opposite to each other. Each track groove 9A comprises the first track groove portion 9Aa and the second track groove portion 9Ab, and each track groove 9B comprises the first track groove portion 9Ba and the second track groove portion 9Bb.

Figure 8:
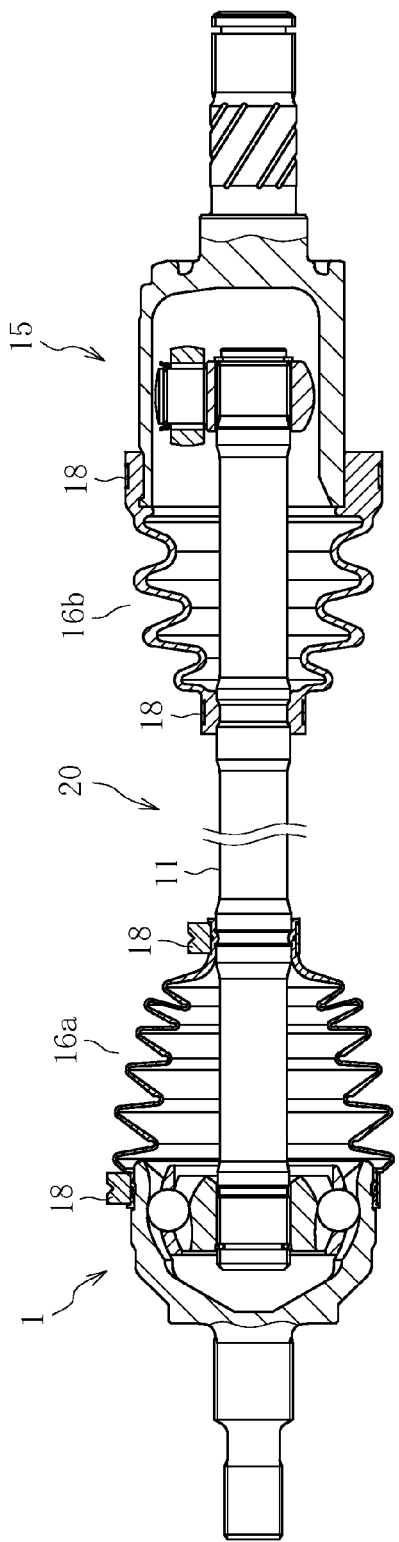
FIG. 8 is a view of an example of an automotive drive shaft to which the fixed type constant velocity universal joint illustrated in FIG. 1 is assembled.

FIG. 8 illustrates an automotive front drive shaft 20, to which the fixed type constant velocity universal joint 1 according to the first embodiment of the present invention is assembled. The fixed type constant velocity universal joint 1 is coupled to one end of an intermediate shaft 11, and a plunging type constant velocity universal joint 15 (in the example of FIG. 8, a tripod type constant velocity universal joint) is coupled to another end of the intermediate shaft 11. At positions between an outer peripheral surface of the fixed type constant velocity universal joint 1 and an outer peripheral surface of the shaft 11 and between an outer peripheral surface of the plunging type constant velocity universal joint 15 and the outer peripheral surface of the shaft 11, bellows boots 16a and 16b are mounted and fixed with boot bands 18, respectively. Grease is sealed inside the joint as a lubricant. Through use of the fixed type constant velocity universal joint 1 according to the present invention, it is possible to attain a lightweight and compact automotive drive shaft 20 that is suppressed in torque loss and heat generation, enhanced in efficiency, and is capable of forming high operating angles.

The constant velocity universal joint 1 according to the first embodiment of the present invention is described above, but various modifications may be made to the constant velocity universal joint 1 without departing from the spirit of the present invention. Now, a constant velocity universal joint according to other embodiments of the present invention is described. Note that, the structure different from that of the above-mentioned first embodiment is mainly described below, and the members and parts having similar functions to those of the first embodiment are represented by the same reference symbols to omit redundant description thereof.

Figure 9:
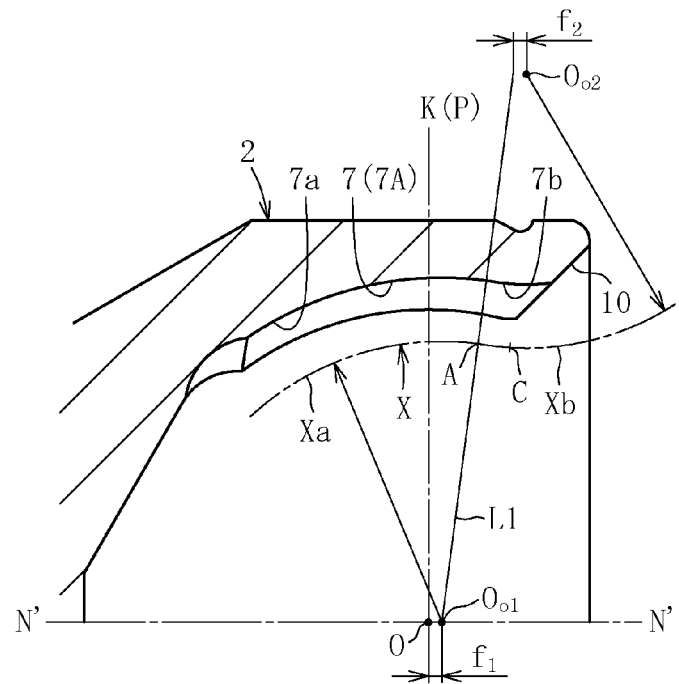
FIG. 9 is a vertical sectional view of an outer joint member to be used in a fixed type constant velocity universal joint according to a second embodiment of the present invention.

FIG. 9 is a sectional view of a main part of a fixed type constant velocity universal joint according to a second embodiment of the present invention. FIG. 9 is a sectional view of an outer joint member to be assembled for use into the fixed type constant velocity universal joint, more specifically, a sectional view of an outer joint member taken along the plane M (see FIG. 2a) including the ball raceway center line X of the track groove 7A and the joint center O as in FIG. 4. In addition, the structure of the constant velocity universal joint according to this embodiment is different from that of the above-mentioned constant velocity universal joint according to the first embodiment in that the second track groove portion provided in each of the track grooves of the outer joint member and the inner joint member comprises a linear part and an arc part (arc part curved in an opposite direction to that of the first track groove portion).

Specifically, the curvature center $O_{o2}$ of the ball raceway center line Xb of the second track groove portion 7b of the outer joint member 2 is arranged at a position shifted by $f_2$ to the opening side with respect to the straight line L1 connecting the curvature center $O_{o1}$ of the first track groove portion 7a (ball raceway center line Xa of the first track groove portion 7a) and the end portion A on the opening side of the first track groove portion 7a (ball raceway center line Xa of the first track groove portion 7a). Therefore, the linear part (end portion on the interior side of the linear part) of the ball raceway center line Xb of the second track groove portion 7b is connected to the end portion A on the opening side of the ball raceway center line Xa of the first track groove portion 7a, and the arc part of the ball raceway center line Xb of the second track groove portion 7b is connected to an end portion (point C) on the opening side of the linear part. In addition, although illustration is omitted, the ball raceway center line Y of the track groove 9 of the inner joint member 3 is formed so as to be mirror-image symmetrical with the ball raceway center line X of the paired track groove 7 of the outer joint member 2 with respect to the joint center plane P at the operating angle of 0°.

Figure 10:
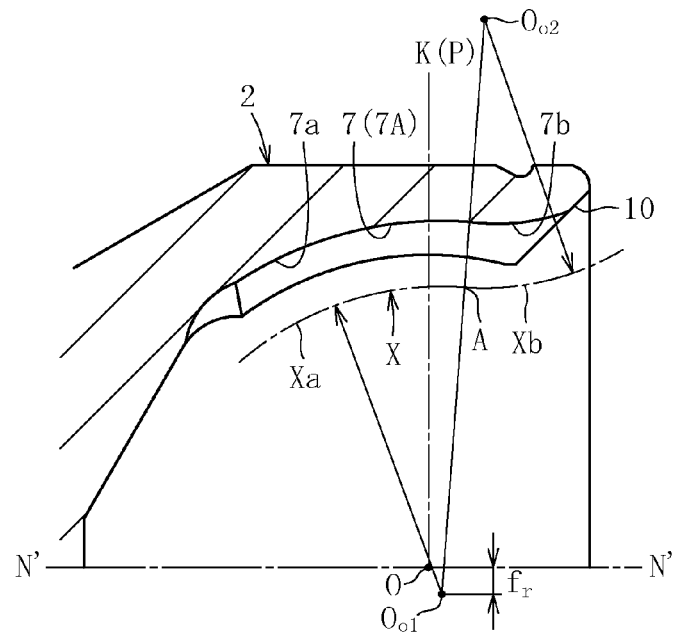
FIG. 10 is a vertical sectional view of an outer joint member to be used in a fixed type constant velocity universal joint according to a third embodiment of the present invention.

FIG. 10 is a sectional view of a main part of a fixed type constant velocity universal joint according to a third embodiment of the present invention. FIG. 10 is a sectional view of an outer joint member to be assembled for use into the fixed type constant velocity universal joint, more specifically, a sectional view of an outer joint member taken along the plane M (see FIG. 2a) including the ball raceway center line X of the track groove 7A and the joint center O as in FIGS. 4 and 9. The structure of the constant velocity universal joint according to this embodiment is mainly different from that of the above-mentioned fixed type constant velocity universal joint according to the first embodiment in that the curvature centers of the ball raceway center lines of the first track groove portions provided in the track grooves of the outer joint member and the inner joint member are offset to the opening side and the interior side with respect to the joint center O, respectively, and are also offset in the radial direction with respect to the inclined axis N'-N' (axis inclined in the peripheral direction with respect to the joint axial line N-N), and that the structures of the ball raceway center lines of the second track groove portions are adjusted in accordance with the above-mentioned offset.

Specifically, the curvature center $O_{o1}$ of the ball raceway center line Xa of the first track groove portion 7a of the outer joint member 2 is offset to the opening side with respect to the joint center O, and is also offset by $f_r$ in the radial direction with respect to the inclined axis N'-N'. That is, the curvature center $O_{o1}$ is offset by $f_r$ in the radial direction on the joint center plane P including the perpendicular line K at the operating angle of 0°. Along with this, the position of the curvature center $O_{o2}$ of the ball raceway center line Xb of the second track groove portion 7b is adjusted so that the ball raceway center line Xb is smoothly connected to the end portion A on the opening side of the ball raceway center line Xa of the first track groove portion 7a. With this structure, the track groove depths on the interior side of the joint can be adjusted. Although illustration is omitted, the ball raceway center line Y of the track groove 9 of the inner joint member 3 is formed so as to be mirror-image symmetrical with the ball raceway center line X of the paired track groove 7 of the outer joint member 2 with respect to the joint center plane P at the operating angle of 0°.

Figure 11:
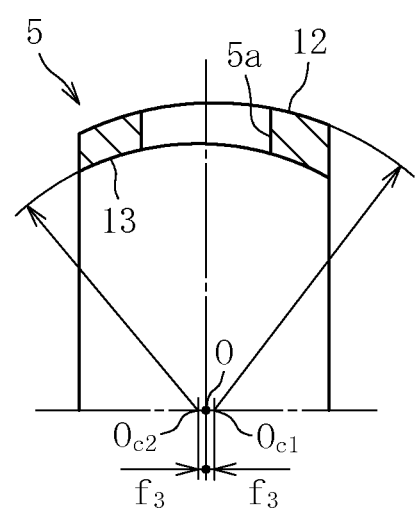
FIG. 11 is a partial vertical sectional view of a cage to be used in a fixed type constant velocity universal joint according to a fourth embodiment of the present invention.

FIG. 11 is a sectional view of a cage to be used in a fixed type constant velocity universal joint according to a fourth embodiment of the present invention. That is, the structure of the fixed type constant velocity universal joint according to this embodiment is different from that of the fixed type constant velocity universal joint according to the first embodiment in that the curvature centers of the spherical outer peripheral surface and the spherical inner peripheral surface of the cage to be used are offset in the axial direction with respect to the joint center O.

Specifically, as illustrated in FIG. 11, a curvature center $O_{c1}$ of the spherical outer peripheral surface 12 of the cage 5 is offset by a dimension $f_3$ to the opening side with respect to the joint center O, and a curvature center $O_{c2}$ of the spherical inner peripheral surface 13 of the cage 5 is offset by the dimension $f_3$ to the interior side with respect to the joint center O. With this structure, the thickness of the cage 5 is gradually increased as the distance to the opening side becomes smaller, with the result that the strength of the cage 5 can be enhanced particularly at high operating angles. As described above, in the range of high operating angles, the balls 4 arranged in the peripheral direction are temporarily separately positioned between the first track groove portions 7Aa and 9Aa (7Ba and 9Ba) and between the second track groove portions 7Ab and 9Ab (7Bb and 9Bb). In this case, the pressing forces toward the opening side are applied from the balls 4 positioned between the second track groove portions 7Ab and 9Ab (7Bb and 9Bb) to the pocket portions 5a of the cage 5. However, the thickness of the cage 5 is gradually increased as the distance to the opening side becomes smaller, with the result that the strength of the cage 5 can be enhanced. Further, the track groove depths of the track grooves 7 and 9 (first track groove portions 7a and 9b) on the interior side can be increased.

In the above-mentioned fixed type constant velocity universal joint according to the present invention, the number of the balls 4 is set to eight. However, the present invention is not limited thereto. Although illustration is omitted, the present invention is also suitably applicable to a fixed type constant velocity universal joint comprising, for example, ten or twelve balls.

Further, in the fixed type constant velocity universal joint according to the embodiments described above, the second track groove portion (ball raceway center line Xb of the second track groove portion) comprises only an arc part, or comprises an arc part and a linear part in combination. However, the present invention is not limited thereto. It is only necessary that the shape of the ball raceway center line Xb of the second track groove portion be different from that of the ball raceway center line Xa of the first track groove portion so as to increase the effective track length and therefore achieve high operating angles. Under this condition, any shape may be employed as appropriate, and for example, an elliptical shape or a linear shape may be employed as well. Further, one or both of the first track groove portion and the second track groove portion may be formed of a plurality of arc parts instead of the single arc part in consideration of the track groove depths and the like.

Further, the above description is directed to the case where the present invention is applied to the fixed type constant velocity universal joint having the track grooves arranged at a regular pitch in the peripheral direction. However, the present invention is also suitably applicable to a fixed type constant velocity universal joint having the track grooves arranged at an irregular pitch. Still further, in the above-mentioned fixed type constant velocity universal joint, the inclination angles γ of the track grooves (first track groove portions) with respect to the joint axial line N-N are set equal to each other in all the track grooves, but the present invention is not limited thereto. As long as the inclination angles γ of the paired track grooves (first track groove portions) (opposed to each other in the radial direction) of the outer joint member and the inner joint member are set equal to each other, the inclination angles γ of the track grooves (first track groove portions) may be set unequal to each other. It is only necessary that the inclination angles be set so that the axial forces of the balls are applied in a balanced manner as a whole to all the pocket portions of the cage in the peripheral direction. Further, in the above description, the present invention is applied to the fixed type constant velocity universal joint configured so that the track grooves and the balls are held in contact (angular contact) at a contact angle. However, the present invention is not limited thereto. The present invention is also suitably applicable to a fixed type constant velocity universal joint configured so that the track grooves and the balls are held in circular contact by forming the track grooves into a circular shape in horizontal cross section.

The present invention is not limited to the embodiments described above, and as a matter of course, may be carried out in various other embodiments without departing from the spirit of the present invention. The scope of the present invention is defined in the claims, and encompasses meaning of equivalents of elements described in the claims and all modifications within the scope of claims.

REFERENCE SIGNS LIST 1 fixed type constant velocity universal joint (constant velocity universal joint)
2 outer joint member
3 inner joint member
4 ball
5 cage
6 spherical inner peripheral surface
7 track groove
7a first track groove portion
7b second track groove portion
8 spherical outer peripheral surface
9 track groove
9a first track groove portion
9b second track groove portion
12 spherical outer peripheral surface
13 spherical inner peripheral surface
20 drive shaft
A end portion on opening side
B end portion on interior side
K perpendicular line
L1, L2 straight line
M plane including ball raceway center line
N joint axial line
N' inclined axis
O joint center P joint center plane
Q plane including ball raceway center line
R1, R2 straight line
X ball raceway center line
Y ball raceway center line
γ inclination angle
β angle
θ operating angle

The invention claimed is:

1. A fixed type constant velocity universal joint, comprising:
    an outer joint member having a spherical inner peripheral surface in which a plurality of track grooves are formed so as to extend in an axial direction of the outer joint member,
        the outer joint member having an opening side and an interior side spaced apart from each other in the axial direction;
    an inner joint member having a spherical outer peripheral surface in which a plurality of track grooves are formed so as to be paired with the plurality of track grooves of the outer joint member;
    a plurality of balls for transmitting torque,
        the plurality of balls being interposed between the plurality of track grooves of the outer joint member and the plurality of track grooves of the inner joint member; and
    a cage for holding the plurality of balls,
        the cage having a spherical outer peripheral surface and a spherical inner peripheral surface, which are fitted to the spherical inner peripheral surface of the outer joint member and the spherical outer peripheral surface of the inner joint member, respectively,
    wherein the plurality of track grooves of the outer joint member comprise:
        first track groove portions positioned on the interior side; and
        second track groove portions positioned on the opening side,
    wherein each of the first track groove portions is formed into an arc shape having a curvature center at a position offset to the opening side with respect to a joint center,
    wherein the first track groove portions are inclined in a peripheral direction of the outer joint member with respect to a joint axial line and adjacent to each other in the peripheral direction with their inclination directions opposite to each other,
    wherein each of the second track groove portions is formed into a different shape from the arc shape of the each of the first track groove portions so as to increase an effective track length at a maximum operating angle,
    wherein the each of the second track groove portions is connected to the each of the first track groove portions at a position on the opening side with respect to the joint center, and
    wherein each of the plurality of track grooves of the inner joint member is formed so as to be mirror-image symmetrical with a corresponding one of the plurality of paired track grooves of the outer joint member with respect to a joint center plane at an operating angle of 0°.

2. The fixed type constant velocity universal joint according to claim 1, wherein an angle (β) formed by a straight line connecting the joint center and a connection point between the each of the first track groove portions and the each of the second track groove portions with respect to the joint center plane at the operating angle of 0° is set to 3° to 10°.

3. The fixed type constant velocity universal joint according to claim 1, wherein the curvature center of the each of the first track groove portions is arranged on an inclined axis, which is inclined in the peripheral direction with respect to the joint axial line.

4. The fixed type constant velocity universal joint according to claim 1, wherein the curvature center of the each of the first track groove portions is arranged at a position offset in a radial direction of the outer joint member with respect to an inclined axis, which is inclined in the peripheral direction with respect to the joint axial line.

5. The fixed type constant velocity universal joint according to claim 1, wherein a curvature center of the spherical outer peripheral surface of the cage is arranged at a position offset to the opening side with respect to the joint center, and a curvature center of the spherical inner peripheral surface of the cage is arranged at a position offset to the interior side with respect to the joint center.

6. The fixed type constant velocity universal joint according to claim 1, wherein the each of the second track groove portions comprises an arc part having a curvature center at a position that is a radially outer side of the each of the first track groove portions and offset to the opening side with respect to the joint center.

7. The fixed type constant velocity universal joint according to claim 6, wherein the each of the second track groove portions comprises the arc part alone, and the arc part is smoothly connected to the each of the first track groove portions.

8. The fixed type constant velocity universal joint according to claim 6, wherein the each of the second track groove portions comprises the arc part and a linear part, and the linear part is smoothly connected to the each of the first track groove portions.

9. The fixed type constant velocity universal joint according to claim 1, wherein a number of the plurality of balls is set to eight, ten, or twelve.

* * * * *